US011225435B2

(12) United States Patent
Siebers et al.

(10) Patent No.: US 11,225,435 B2
(45) Date of Patent: Jan. 18, 2022

(54) METHOD FOR PRODUCING A COATED SUBSTRATE, PLANAR SUBSTRATE, COMPRISING AT LEAST TWO LAYERS APPLIED BY MEANS OF HEATING, AND THE USE OF THE COATED SUBSTRATE

(71) Applicant: SCHOTT AG, Mainz (DE)

(72) Inventors: Friedrich Siebers, Nierstein (DE);
Michael Schwall, Mainz (DE);
Matthias Bockmeyer, Mainz (DE);
Vera Steigenberger, Bischofsheim (DE)

(73) Assignee: SCHOTT AG, Mainz (DE)

(*) Notice: Subject to any disclaimer, the term of this patent is extended or adjusted under 35 U.S.C. 154(b) by 136 days.

(21) Appl. No.: 16/798,834

(22) Filed: Feb. 24, 2020

(65) Prior Publication Data

US 2020/0189968 A1 Jun. 18, 2020

Related U.S. Application Data

(60) Division of application No. 15/399,031, filed on Jan. 5, 2017, now Pat. No. 10,611,677, which is a
(Continued)

(30) Foreign Application Priority Data

Jul. 16, 2014 (DE) .......................... 102014213859.0
Oct. 9, 2014 (DE) .......................... 102014220457.7

(51) Int. Cl.
*C03C 17/00* (2006.01)
*C03C 17/04* (2006.01)

(52) U.S. Cl.
CPC .......... *C03C 17/007* (2013.01); *C03C 17/002* (2013.01); *C03C 17/008* (2013.01);
(Continued)

(58) Field of Classification Search
CPC ..... C03C 17/007; C03C 17/04; C03C 17/002; C03C 17/008; C03C 2217/47;
(Continued)

(56) References Cited

U.S. PATENT DOCUMENTS

| 5,776,613 A | 7/1998 | Shimatani |
| 5,866,239 A | 2/1999 | Shimatani |

(Continued)

FOREIGN PATENT DOCUMENTS

| CN | 103030303 | 4/2013 |
| DE | 19721737 | 11/1998 |

(Continued)

OTHER PUBLICATIONS

International Search Report dated Jan. 21, 2016 for corresponding PCT/EP2015/065329.

(Continued)

*Primary Examiner* — Nathan L Van Sell
(74) *Attorney, Agent, or Firm* — Ohlandt, Greeley, Ruggiero & Perle, L.L.P.

(57) ABSTRACT

A panel like, double-sided coated substrate and a method for production are provided. The panel like substrate includes at least two layers applied by heating, the first layer being applied on a first side of the substrate and having at least a glass component and structure-forming particles, the particles producing elevations on the first layer, and the softening temperature or the melting temperature of the particles being greater than the softening temperature of the glass component, and the second layer being applied on a second side of the substrate.

17 Claims, 2 Drawing Sheets

Related U.S. Application Data continuation of application No. PCT/EP2015/065329, filed on Jul. 6, 2015.

(52) U.S. Cl.
CPC ........ *C03C 17/04* (2013.01); *C03C 2217/452* (2013.01); *C03C 2217/465* (2013.01); *C03C 2217/47* (2013.01); *C03C 2217/475* (2013.01); *C03C 2217/477* (2013.01); *C03C 2217/478* (2013.01); *C03C 2217/485* (2013.01); *C03C 2218/365* (2013.01)

(58) Field of Classification Search
CPC ........ C03C 2217/475; C03C 2217/477; C03C 2217/478; C03C 2217/452; C03C 2217/465; C03C 2217/485; C03C 2218/365; F24C 15/005; Y02P 40/57
See application file for complete search history.

(56) References Cited

U.S. PATENT DOCUMENTS

| | | | |
|---|---|---|---|
| 6,043,171 A | 3/2000 | Siebers | |
| 2001/0031360 A1 | 10/2001 | Rudder | |
| 2003/0152780 A1 | 8/2003 | Baumann | |
| 2010/0273631 A1 | 10/2010 | Pelletier | |
| 2013/0140293 A1 | 6/2013 | Doerk | |
| 2013/0273320 A1 | 10/2013 | Bockmeyer | |
| 2013/0316142 A1 | 11/2013 | Nüttgens | |
| 2014/0120252 A1 | 5/2014 | Savary | |
| 2014/0193627 A1 | 7/2014 | Pelletier | |
| 2014/0357468 A1 | 12/2014 | Siebers | |

FOREIGN PATENT DOCUMENTS

| | | |
|---|---|---|
| DE | 10016485 | 10/2001 |
| DE | 102004059728 | 6/2006 |
| DE | 102011115379 | 4/2013 |
| DE | 102012202697 | 8/2013 |
| DE | 102012103507 | 10/2013 |
| EP | 0895969 | 2/1999 |
| EP | 1845069 | 10/2007 |
| EP | 2532629 | 12/2012 |
| EP | 2592056 | 5/2013 |
| GB | 2241179 | 8/1991 |

OTHER PUBLICATIONS

Written Opinion dated Jan. 21, 2016 for corresponding PCT/EP2015/065329.
International Preliminary Report on Patentability dated Jan. 17, 2017 for corresponding PCT/EP2015/065329.

METHOD FOR PRODUCING A COATED SUBSTRATE, PLANAR SUBSTRATE, COMPRISING AT LEAST TWO LAYERS APPLIED BY MEANS OF HEATING, AND THE USE OF THE COATED SUBSTRATE

CROSS REFERENCE TO RELATED APPLICATIONS

This application is a division of U.S. application Ser. No. 15/399,031 filed on Jan. 5, 2017, which is a continuation of International Application PCT/EP2015/065329 filed on Jul. 6, 2015, which claims the benefit of German Application 102014213859.0 filed on Jul. 16, 2014 and German Application 102014220457.7 filed on Oct. 9, 2014, the entire contents of all of which are incorporated by reference herein.

BACKGROUND

1. Field of the Invention

The invention relates to a method for producing a coated substrate, to a panel like substrate comprising at least two layers applied by heating, and to the use of the coated substrate.

2. Description of Related Art

It is known, that inorganic, glass-based coatings endow the surfaces with particular qualities. The glass fraction of the coating, often termed glass frit or glass flux, gives the coating particular chemical and physical properties. These are, for example, chemical resistance, abrasion and scratch resistance, and thermal stability. As compared with coatings having an organic matrix, the inorganic coatings are notable for greater gloss and greater resistance toward UV irradiation. By addition of coloring pigments, antireflection additives or dulling additives, diverse possibilities are provided for differentiating and configurating the coated panes and articles produced from them in terms of aesthetics and design. The coating operation itself is usually termed glazing, enameling, decorating or printing. There are diverse, technically established methods and equipment in use for the coating. In addition to dry coating, such as by electrostatic powder application, for example, there exist numerous coating methods in which a liquid or pastelike coating material is applied. This paste may be applied to the surface of the pane by a variety of methods, as for example by screen printing, pad printing, transfer methods or else by dipping and spraying methods. The paste consists customarily of the ground glass powder, the optionally added pigments and/or additives, and the organic auxiliaries, which are removed during the baking and the flowing and leveling of the coating. For the coating of glass, glass-ceramic or ceramic panes there are a multitude of enamel compositions known.

For instance, DE 197 21 737 C1 describes a lead-free and cadmium-free glass composition for the glazing, enameling, and decorating of glasses or glass-ceramics, and also a method for producing a glass-ceramic coated with said composition.

The addition of structure-forming particles to glass-based coatings to give them special qualities is known. For instance, DE 100 16 485 A1 describes glass-based coatings on glass, glass-ceramic or metal substrates where structure-forming particles are used that have an average particle diameter in the range from 0.1 to 50 µm. The resulting, micro-rough and additionally hydrophobized surface structure endows the layer with self-cleaning properties (Lotus effect). The effect is based on a rough, non-rounded surface microstructure.

Specification EP 2 592 056 A1 as well describes layers on glass or glass-ceramic substrates that have structure-imparting inorganic particles in the coating. The particles produce elevations on the layer and hence a tactile structure. The addition of the structure-imparting particles endows the user-facing surface with a tactile function.

Articles having adhesion-reducing coatings and methods for producing them are known. For instance, US 2001/0031360 A1 describes a method for producing so-called, non-sticking, surfaces, which involves embedding diamond powder of size <50 µm into a glass frit. The glass frit acts as a binder and forms the layer, whereby the durability of articles such as cookware or leisure products is increased and the surface is endowed with "non-sticking" qualities.

It is known from GB 2 241 179 A, moreover, that polymer coatings are provided with glass beads in order to obtain surfaces having adhesion-reducing properties.

Enamel colors with adhesion-reducing properties for the coating of glass panes are known. The principle on which these adhesion-reducing properties are based is as follows. The black coatings at the edges of automobile screens are produced using glass-based enamel colors having adhesion-reducing properties. This is necessary when, during press bending, for example, the color makes contact with the pressing tool at relatively high temperatures. In the joint bending of glass panes for a correctly fitting laminate assembly as well, adhesion-reducing colors are needed if a decorated side of glass is in direct contact with another glass pane at the relatively high temperatures the operation entails. The basis for the adhesion-reducing properties of these enamel colors is the partial crystallization of the glass frit. The crystals prevent the colors from sticking at elevated temperatures. The crystallization must be closely controlled, since otherwise, if crystallization is insufficient, sticking will occur. If the crystallization of the glass frit is too great, it does not melt to a pore-free form, and, moreover, the color becomes gray. In crystallization, efforts are made, via the composition of the glass component, the temperature regime, and, optionally, through addition of nucleators, to ensure compliance with this narrow operating window. The most common crystallizing phases are bismuth-silicates, zinc silicates, and zinc borates. The narrow operating window described is economically and technically disadvantageous for this method, and the possibilities for configuration in terms of design are limited. Colors of this kind are disclosed in EP 0 895 969 A1.

The use of so-called levitation kilns allows the double-sided application of glass-based coatings, since the coating on firing has no contact with the underlay. In the critical temperature range in which the glass component melts, flows, and levels, contact is avoided by means of a gas cushion, and so there can be no sticking and no damage to the coating. In constructional terms, the ceramic underlays in this case must be gas-permeable and the quantity and temperature of the gas must be controlled in defined ways. Guidance and transport of the panes must be managed as well. It is difficult technically to integrate the operating step of thermal prestressing, which is carried out by blowing cold air onto the hot glass substrate, without a contact, since the panes have to be fixed. On account of the high operating and acquisition costs, therefore, this technique entails economic disadvantages.

SUMMARY

Panes, mostly in transparent form, find widespread use both indoors and out. Examples, in the indoor segment, include viewing panes in electrical devices, in doors, shower enclosures, and kitchen furniture, or facing elements in exterior architecture. In order to expand the possibilities for configuration and design, it is desirable to employ inorganic coatings on both sides. The advantages of the inorganic glass-based coatings can be shown accordingly on both sides.

The resulting object of the present invention is to find a method for the straightforward, economic production of a substrate coated on both sides with layers that are applied with exposure to heat. A further object arising is that of providing a panel like substrate which can be produced simply and economically and which comprises at least two layers applied by heating, and indicating the use of the coated substrate. The coating is to meet the requirements imposed on coated panel like substrates in practical use, especially in the household environment, such as abrasion resistance, scratch resistance and also thermal stability and chemical resistance.

DETAILED DESCRIPTION

Figure 1:
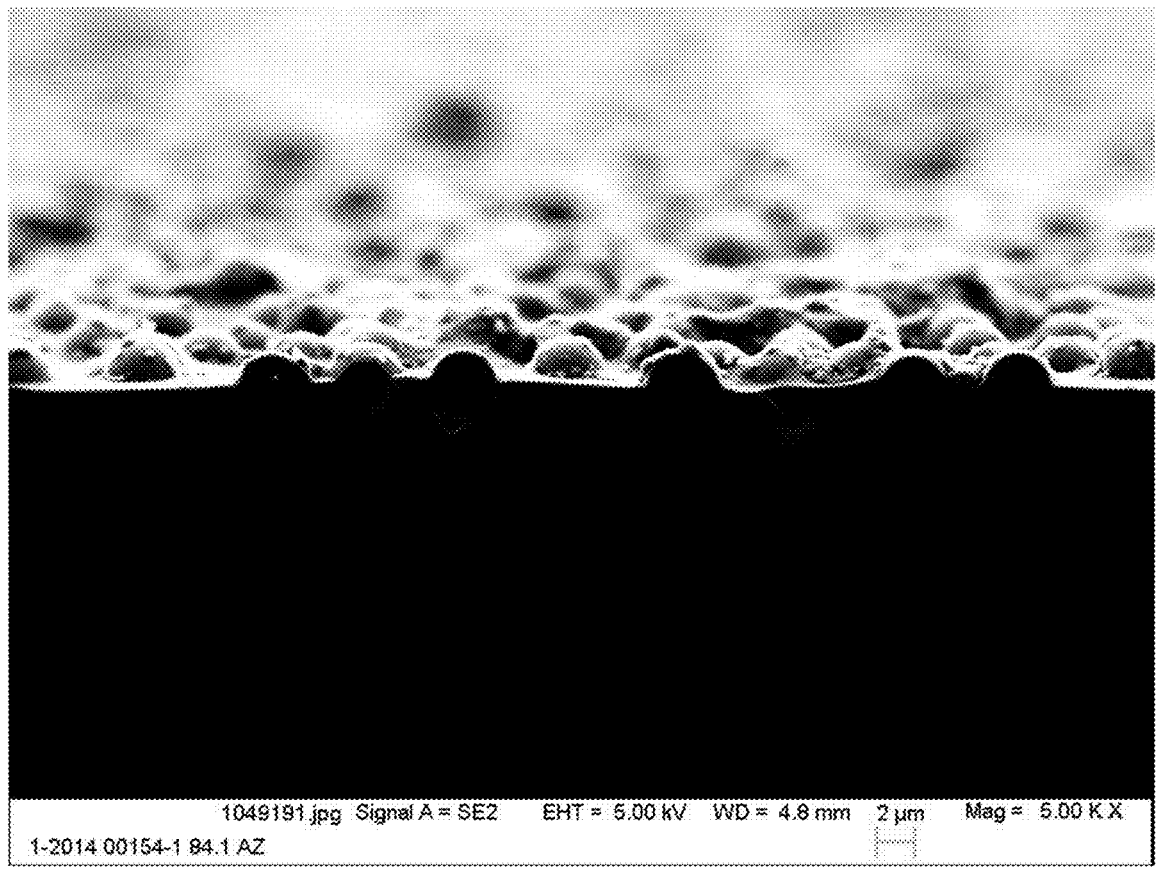
FIG. 1 shows an electron micrograph of the fracture edge of a substrate with the first layer, comprising the structure-forming particles according to an embodiment of the present disclosure.

The object is achieved by a method for producing a coated substrate, including the steps of: providing a panel like substrate; applying a first layer-forming material to a first side of the substrate, the first layer-forming material comprising at least a glass powder and particles, the particles producing elevations on the layer, heating the coated substrate to give the first layer with elevations; applying a second layer-forming material to a second side of the substrate, the second side being opposite the first side; heating the coated substrate to give the second layer, the substrate lying wholly or partly on the elevations of the first layer during heating.

The particles are therefore structure-forming particles.

During the heating of the coated substrate to give the second layer, where the substrate, during heating, lies wholly or partly on the elevations of the first layer, there is substantially no longer any change in the elevations of the first layer. When using structure-forming particles having organic fractions which undergo conversion during firing, the considerations for the types of particle and particle geometries are valid after the firing of the layer.

The softening temperature or the melting temperature of the particles is preferably greater than the softening temperature of the glass powder. "The softening temperature or the melting temperature of the particles is greater than the softening temperature of the glass powders" means the following: Where the particles possess a melting temperature (e.g. particles of inorganic compounds such as $Al_2O_3$ or $ZrO_2$), this melting temperature must be greater than the softening temperature of the glass powder. Where the particles possess a softening temperature (e.g. particles of glasses), this softening temperature must be greater than the softening temperature of the glass powder.

The temperature on heating is preferably at or above the softening temperature of the glass powder and below the melting temperature or the softening temperature of the particles.

The average diameter of the particles is preferably greater than the average diameter of the glass powder. So that the particles produce elevations on the layer, the layer-forming material is applied preferably in a layer thickness such that the particles are able to protrude from the layer.

In accordance with the invention, after the first heating, the first layer has anti-sticking properties. Anti-sticking properties for the purposes of the present patent specification mean essentially that the substrate, during the second heating, lies wholly or partly on the elevations of the first layer, with the first layer not adhering to the underlay on which the substrate lies. As a result, there is little or no alteration to the structure of the first layer.

The second layer-forming material of the second layer preferably also comprises at least one glass powder. The advantages of a glass-based inorganic enamel coating are therefore realized on both sides after firing.

The baking temperature when heating the second coating is to be preferably at least 500° C. and more preferably at least 600° C. Higher temperatures are advantageous for the layer properties, such as chemical resistance, gloss, abrasion resistance and scratch resistance, and thermal stability.

The preferred values for the baking temperature are also valid for the heating of the first layer.

In order to achieve advantageous layer properties on both sides, it is advantageous for the heating temperatures of the two layers to differ by less than 200° C., preferably less than 100° C.

The object is further achieved by a panel like substrate comprising at least two layers applied by heating, where the first layer is applied on a first side of the substrate and comprises at least a glass component and particles, the particles produce elevations on the first layer, in that the softening temperature or the melting temperature of the particles is greater than the softening temperature of the glass component, and the second layer is applied on a second side of the substrate, the second side being opposite the first side.

The glass component is obtained preferably from a glass powder.

For the anti-sticking properties, the microstructure of the surface of the first layer after heating must be such that the elevations formed act as spacers and a ceramic underlay has no contact with the adhesive glass component in the coating during the second heating (e.g., firing). In order to ensure the adhesion of the coating to the substrate and the fixing of the structure-forming particles, temperatures are required at which the glass component in the coating undergoes flow and leveling. Automatically entailed by these requisite operations, on account of the low viscosity, is an increased adhesive bonding effect on the part of the glass component. In order to ensure these mechanisms and functions during firing, the first layer-forming material (the coating) is to consist preferably of at least 5 vol % of a glass powder (layer-forming glass component) and of structure-forming particles, more particularly inorganic particles. In order to avoid sticking, a fraction of structure-forming particles of at least 0.1 vol % is preferred. At a fraction of less than 5 vol % of glass powder, the fixing of the structure-forming particles is no longer reliably ensured and the scratch resistance of the coated substrate is unallowably reduced. The fraction of the glass powder is preferably at least 10 and more preferably at least 20 vol %. The upper limit on the fraction of the glass powder is preferably at most 99.7 vol %, more preferably at most 80 vol %, and very preferably at most 70 vol %. At levels of more than 99.7 vol % of glass powder, there is a risk of adverse effects on the anti-sticking properties.

The balance to 100 vol % is determined by the particles and any further additions to the first layer-forming material. The organic auxiliary, which is removed during firing, is not included in the calculation. The fraction of structure-forming particles is also selected in dependence on the roughness of the ceramic underlay during heating. A rougher underlay necessitates higher fractions.

The fraction of structure-forming particles is preferably 0.3 to 80 vol %. Experiments have shown that even with these very low particle additions of 0.3 vol %, depending on the nature of the underlay, it is possible to prevent adhesion, and thus to achieve the desired anti-sticking properties.

The average diameter of the particles is preferably 0.5 to 40 μm. The average particle diameter is selected such as to ensure that the particles protrude as elevations from the layer.

In one preferred embodiment, the second layer likewise comprises a glass component. With particular preference the layer materials on both sides of the substrate consist of inorganic, glass-based enamel.

In another preferred embodiment, the softening temperatures of the glass components on both sides of the substrate differ by less than 200 K, more preferably less than 100 K.

The substrate of the invention can therefore have high-grade glass-based layers, preferably enamel layers, on both sides, and the softening temperatures of the glass component can be very close to one another. Hence it is also conceivable for the same glass-based layer, preferably the same glass-based enamel, to be used on both sides.

The average spacings between the particles here is preferably to be less than twenty times the average particle diameter. The average spacings are based on the spacing between the particle center points. With higher average spacings between the particles, the anti-sticking properties are no longer reliably ensured. Preferred are average spacings between the particles of less than ten times and more preferably of less than five times the average particle diameter.

Measured on the basis of their average particle diameter, the particles are to protrude in sufficient number to an extent of at least 10% to at most 70% from the layer which is formed, as a result of the heating, essentially from the glass powder. If the particles protrude to an extent of less than 10%, the anti-sticking properties are impaired by adhesive bonding effects. With greater than 70% elevations, there is a risk that the particles are no longer adequately fixed and the scratch resistance will be unallowably reduced. The elevations amount preferably to 60% at most and more preferably 50% at most. For a further-improved anti-sticking property, the lower limit on the elevations is at least 20% and preferably at least 30% of the average particle diameter.

For the formation of the surface structure of the first layer (on the basis of the particles which produce elevations), therefore, it is important that the amount of the glass powder (layer-forming glass component) is preferably selected such that the average thickness of the glass-based layer that comes about on heating (e.g. firing) is always smaller than the average particle diameter. This relationship is also valid for a multilayer construction of the coating. If the coating is built up over a plurality of layers, the critical surface structure is that which comes about after the last heating.

Good properties are achieved with micro roughnesses, measured as PV value of between 3 to 35 μm. The PV value is the difference in height between the lowest and highest points over the section measured. The highest point here corresponds to the tip of the protruding particle, and the lowest point lies between two particles and is formed by the glass-forming layer. The lower limit is determined by the requirement for anti-sticking properties, and the upper limit by that for sufficient scratch resistance. The range of the PV value corresponds to roughnesses $R_a$ of 0.1 to 1.5 μm. The $R_a$ value is by definition the mean arithmetic deviation of the height measurement points from the middle height plane. The PV value is preferably at least 5 and more preferably at least 8 μm. For improved scratch resistance, the PV value is to be preferably at most 25, more preferably at most 15, and very preferably at most 10 μm. A specific roughness value which says something about the nature of the surface structure is that known as skewness $R_{sk}$. The skewness value says something about the symmetry of the surface profiles. Low and negative values are characteristic of surfaces with domelike waviness and positive values of surfaces with jagged peaks. $R_{sk}$ values of below 6, preferably below 2, and more preferably below 1 are preferred.

For optimizing the anti-sticking properties, the degree of surface occupancy by the structure-forming particles ought to be greater than 0.4%, preferably greater than 5%, and more preferably greater than 10%.

If the surface structure is maintained, it is possible to vary the thickness of the glassy layer, which is determined by the amount of glass powder. Hence the average thickness of the glassy layer between the particles may be set advantageously at between 0.5 to 50 μm and preferably between 1 to 25 μm.

Comparatively low average layer thicknesses of just 1 to 5 μm are sufficient and are set.

For the panel like substrate comprising at least two layers applied by heating, anti-sticking properties mean that the first layer with elevations, obtained on the first heating (e.g., first firing) can be processed on the second heating (e.g. second firing) in contact with an underlay composed of a firing aid, such as an underlay plate or ceramic rollers, for example, without detractions from its quality. In the case of direct contact with the ceramic underlay materials, the structure-forming particles act as spacers and the coating retains its overall integrity. This means that in quality inspections after heating, no portions of the coating have been damaged or torn away because of sticking. In a later quality control procedure as well, testing for scratch resistance, adhesion, and abrasion, using the "Tesafilm method" (adhesive tape test) or via metal scrapers, for example, the coating remains adhering, and no disrupting effects (pinholes) are discernible.

In one advantageous configuration, the structure-forming particles possess a substantially edgeless, circular outer contour. They are preferably in a spherical embodiment. On account of their rounded, edgeless outer contour, the anti-sticking properties are further optimized, since the usually rough ceramic surfaces of the underlay materials are less able to engage with the coating.

This rounded outer contour is generally advantageous for the scratch resistance as well. An abrasive article or a test tip glides better over the surface and damages the surface less by deformation or extraction of layer constituents. It has further been found that the susceptibility to fingerprints and soiling is also reduced in the case of the rounded surface. Relative to rougher, jagged surfaces, the capillary forces for liquids are reduced. The rounded particles are fixed in the coating by the glass powder (layer-forming glass component) and protrude by their elevations from this layer. The deviation of the outer contour from the spherical form is to be less than +/−30%.

It is advantageous, moreover, if the structure-forming particles present in the coating are of similar size. In terms of their size distribution, the structure-forming particles are preferably to be situated within a tolerance of less than 10 μm size difference between the $d_{90}$ and the $d_{50}$ values. The shape and size distribution of the particles is therefore tied to the requirements concerning their functions as spacers. As a result, a substantially uniform distance between the peaks of the structure-forming particles and the pane is ensured. There are therefore a number of contact points available per unit area for an even distribution of load, while the substrate is lying wholly or partly on the elevations in the course of heating. The weight of the prone substrate is distributed uniformly over a plurality of contact points on the underlay. Stress peaks at individual structure-forming particles, possibly leading to the particles being broken out, are avoided.

In one particular embodiment, the structure-forming particles after the firing of the layer consist of an inorganic inert substance. Their melting temperature or softening temperature is to be above the baking temperature of the coating and hence above the softening temperature of the glass powder. In order to ensure the anti-sticking properties, the structure-forming particles during heating (e.g., firing) shall not undergo unallowable deformation under the weight of the substrate, so that they are able to function as spacers. It is therefore advantageous if the outer contour of the structure-imparting particles does not change at the temperature of the baking operation. Typical temperatures during the heating of coatings are above 500° C., and the softening temperature of the structure-imparting particles ought therefore to be above 500° C., but in any case above the respective baking temperature of the coating. The softening temperature is preferably above 700° C. and more preferably above 900° C. Examples of structure-forming inorganic particles consist of glassy, glass-ceramic or ceramic materials. The glasses in question include soda-lime glass, silica glass, $SiO_2$ and its precursors such as polysiloxanes, methylpolysiloxanes, phenylpolysiloxanes, methylphenylpolysiloxanes, silsesquisiloxanes, sol-gel particles, produced by the Stöber process, and also low-alkali borosilicate glass variants and alkali metal alumino silicate glass variants. Among the glass-ceramic materials, those used for example are materials comprising magnesium aluminum silicate or lithium aluminum silicate, and glass-ceramics with low thermal expansion. In another embodiment, the structure-forming particles may also comprise oxidic materials, examples being aluminum oxide, crystalline silicon oxide, zirconium oxide, tin oxide or doped zirconium oxide, and also zirconium silicate, cordierite, titanium oxide, zinc spinels or magnesium spinels, or zeolites. Non-oxidic ceramics as well may be used, examples being boron nitride and silicon nitride. Table 2 shows a number of selected structure-forming particles and their properties.

The structure-forming particles are preferably selected so that they have a compact massive nature, such that they are not destroyed by the forces which occur on mechanical stressing. Such forces occur during scratching processes or in the course of the spacer function. Hollow spheres which do not withstand such loading, for example, should therefore be avoided.

Moreover, the material of which the structure-forming particles consist is preferably selected such that the coefficient of thermal expansion $\alpha_{20/300}$ is compatible with that of the glass-based layer material. The difference is preferably less than $5 \times 10^{-6}$/K and more preferably less than $3 \times 10_{-6}$/K.

Besides the glass powder (layer-forming glass component) and the structure-forming particles, in a further configuration of the invention, there may be further inorganic components present in the first layer-forming material, or found within the first layer, such as, for example, glassy, glass-ceramic or ceramic fillers and/or pigments. These components may be utilized in order to tailor the thermal expansion of the coating more effectively to that of the substrate or in order to achieve particular aesthetic features or optical effects, such as opacification, dulling or antireflection properties, for example. Pigments suitable include $TiO_2$, spinels in general, CrCu spinels, Fe spinels, mica and mica-based effect pigments, and also commonplace temperature-stable pigments of enamel colors. Further examples are ceramic fillers with low or negative thermal expansion such as cordierite, eucryptite, and zirconium tungstate.

The fraction of the additional inorganic components in the coating is up to 50 vol %, preferably up to 40 vol %, and more preferably up to 30 vol. %. To obtain an effect generally requires at least 0.5 vol %, preferably at least 2 vol %.

In another embodiment, the pigments, fillers or additives themselves are used as structure-forming particles in the quantities, sizes, and shapes according to the invention.

In the case of the organic or semi-organic precursors of glasses such as $SiO_2$ or ceramics, they may be added directly to the powder mixture for the coating. The particles are transformed when the coating is fired. The organic constituents are removed, with the shape being retained. Alternatively, therefore, these precursors—for example, polymethylsilsesquioxane beads—may be heated beforehand in order to burn out the organic components and convert the beads into $SiO_2$ beads. In this case the size of the particles is reduced (in that case by around 15%), with the shape being retained. The organic components are advantageously burned out in order to prevent problems, on further heating of the first layer (anti-sticking coating), resulting from incomplete burnout of the organic components before the glass powder undergoes flow and leveling in the course of layer formation. Otherwise, small residues of organic components may lead to bubbles being formed in the glass component and to additional pores being generated in the layer. In the case of $Bi_2O_3$-containing glass frits, the $Bi_2O_3$ may be partially reduced and thus a slightly brown discoloration may result. In the case of transparent and pigmented coatings, this slight discoloration may be visually disruptive.

The glass powder (layer-forming glass component) is very varied in its possible compositions. There are numerous known glass compositions which, adapted to the deformation temperature of the substrate to be coated, cover a softening range from about 500° C. to 1000° C. For the glass powder to undergo flow and leveling, the heating temperature (e.g., firing temperature) must correspond at least to the softening temperature Ew of the glass powder. Ew is the temperature at which the viscosity of the glass is $10^{7.6}$ dPas. The composition of the glass powder also called glass flux or glass frit, is therefore selected such that the temperature for flow and leveling, expressed by the softening temperature Ew, is below the deformation temperature of the substrate material. Depending on the pane geometry and the heating operation, deformations are observed in the case of substrates made from glass, for example, even well below their Ew. The flow and leveling of the glass component to form a layer is necessary in order to ensure the requisite chemical, physical, mechanical and optical properties. Flow and leveling is also necessary for the fixing of the structure-forming particles and also for the embedding of optionally added pigments and other fillers or additives. Further requirements affecting the selection of the composition of the glass flux are the adaptation of the thermal expansion to that of the substrate material, particularly at relatively high layer thicknesses of above about 5 to 10 μm. At lower layer thicknesses, the stresses relax even on substantial deviation of the thermal expansion, without any delamination or strength problems. Further important selection criteria are properties such as the chemical resistance, with respect to acids and bases or hydrolytic attack, and also the scratch resistance and capacity for cleaning.

A general composition range from which the compositions of the glass powder are selected comprises

| | |
|---|---|
| $SiO_2$ | 20-70 wt % |
| $Al_2O_3$ | 0-20 wt % |
| $B_2O_3$ | 0-35 wt % |
| $Li_2O + Na_2O + K_2O$ | 0-30 wt %, preferably 3-25 wt % |
| $MgO + CaO + SrO + BaO$ | 0-25 wt %, preferably 0-15 wt % |
| $ZnO$ | 0-15 wt % |
| $TiO_2 + ZrO_2$ | 0-10 wt % |
| $Bi_2O_3$ | 0-65 wt % |
| F | 0-3 wt % | and also, optionally, color oxides such as CoO, $Fe_2O_3$, NiO or rare earth elements.

Preferably the coatings and hence also the glass powders (layer-forming glass components) are technically free from toxicologically objectionable components such as Pb, Cd, Hg, $Cr^{VI}$. In exceptional cases, if particularly intense hues are desired, cadmium-containing pigments may be used. Preferably these components are not added deliberately in the coating, and the amount is less than 500 ppm.

For economic and technical reasons it is advantageous if only one side of the substrate is designed such that it possesses anti-sticking properties. For the other side, there are then no restrictions on configuration and design. All customary and known layer thicknesses and compositions of coatings are possible, especially of substantially inorganic enamel coatings. With preference, therefore, only one side of the substrate is designed with additions of structure-forming particles in order to achieve anti-sticking properties.

In a preferred embodiment, the substrate is transparent or translucent. In order to open up diverse possibilities for aesthetic configuration, it is advantageous if the side facing away from the viewer, with the coating, is also visible through the substrate. The coated side facing the viewer, and the side with the second coating facing away from the viewer, make it possible, in their interaction, for diverse design options to be realized in order to achieve particular aesthetic or technical configurations. The light transmittance Y of the uncoated substrate, measured with standard illuminant C/2°, is to be more than 5% (translucent), preferably more than 20%, and more preferably more than 80% (transparent). The light transmittance Y is measured in the CIE color system. This figure is valid irrespective of the thickness of the substrate, which may customarily be between 2 and 10 mm. The substrate material may be transparent, may be transparently colored with color oxides, or may have a translucent appearance as a result of light scattering. Such light scattering may be generated in glass-ceramic substrates or ceramic substrates, for example, through the presence of scattering crystals in the substrate material.

In one preferred embodiment, the substrate material consists of a silicate glass ($SiO_2$ content >40 wt %). Here, advantageously, a floated glass pane composed of a commercial soda-lime glass is the substrate used. Soda-lime panes of this kind are available in various grades, depending on Fe content. With particular preference the soda-lime glass pane has undergone thermal prestressing. In another preferred embodiment it comprises a floated borosilicate glass, such as the floated glass grades BOROFLOAT® 3.3 or BOROFLOAT® 4.0 of SCHOTT AG, for example.

The substrates may also be three-dimensional in form and may be present in various geometries or may be provided with markers. There are various technologies available for such modifications (bending, countersinking, laser treatment, water jetting).

In one alternative embodiment the substrate material consists of a glass-ceramic or of the crystallizable glass precursor for such. Preferred glass-ceramics are those of the LAS type (lithium aluminum silicate glass-ceramics), since on account of their temperature stability they have found broad application in industry. Glass-ceramic of this type can be produced with high-quartz mixed crystals or keatite mixed crystals as principal crystal phases, and, depending on the size of the crystallites in various implementations, may be produced so as to be transparent, transparently colored, translucent or opaque. Examples of such glass-ceramics are the CERAN CLEARTRANS®, ROBAX® and NEXTREMA® products from SCHOTT AG.

Panel like substrates made from inorganic nonmetallic materials find broad use both indoors and out. Preferred materials are those of glass, glass-ceramic or ceramic. In one preferred embodiment the substrate is transparent or translucent. In their dimensions, the substrates are guided by their use and by the availability of large-scale industrial manufacturing processes. In the outdoor sector, for example, in architecture, panes are used which are based on the story heights of around 3 m, with widths of 2 m, for example. Such dimensions can easily be produced via the float process for glass. In the indoor sector, for example, for doors or shower enclosures, typical dimensions are about 2×1 m. As structural constituents in kitchen furniture or kitchen appliances, the dimensions are guided by the kitchen inch measure of 50 or 60 cm width. Front panes or blanking panes in kitchen appliances, such as oven doors, or in electronic devices are guided by the respective design.

Figure 2:
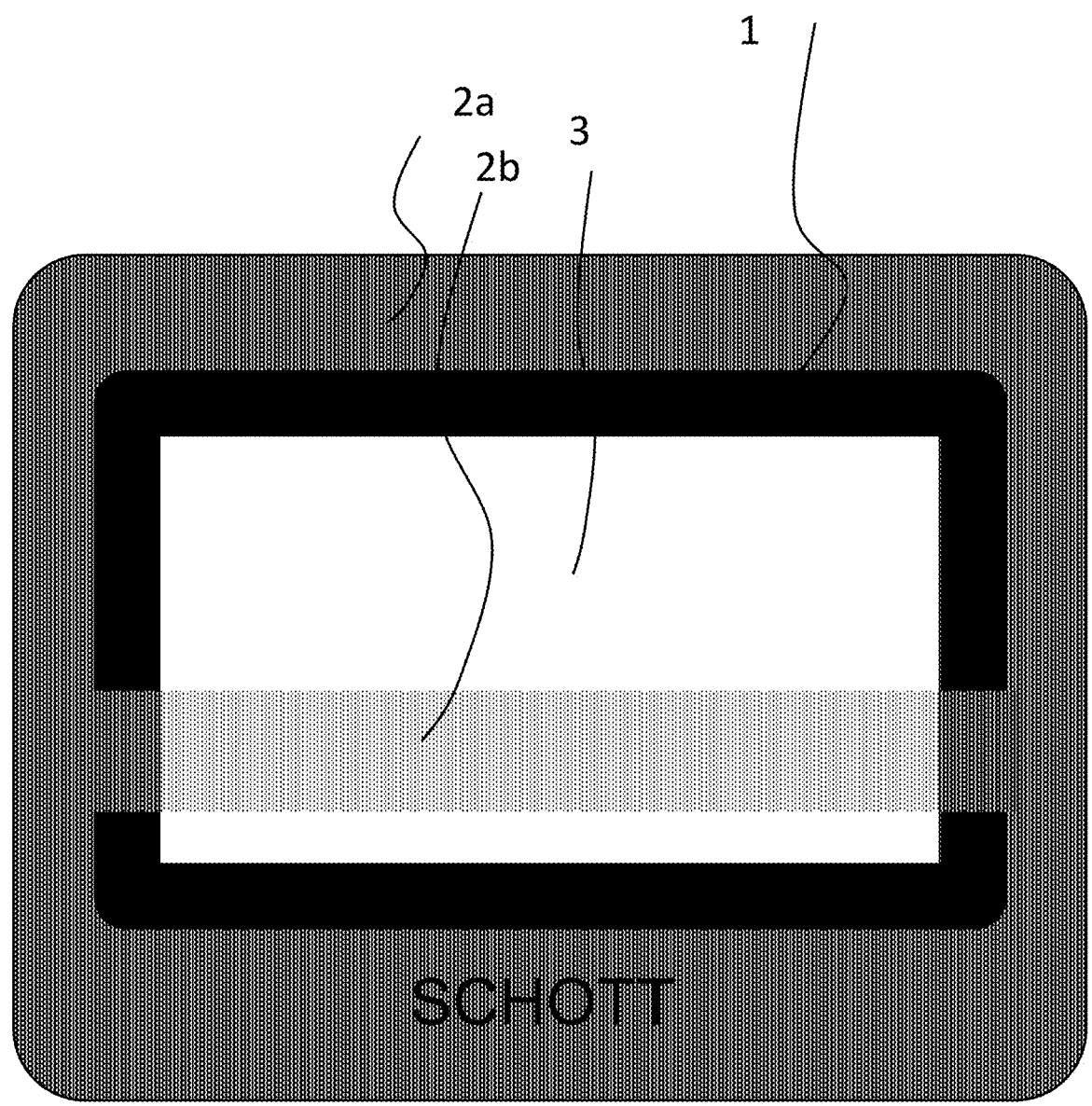
FIG. 2 shows a panel like substrate having layers applied on both sides, looking at the side bearing the first coating according to an embodiment of the present disclosure.

In one preferred version, the design of the coating having anti-sticking properties is such that through the choice (amount, size, shape) of the structure-forming particles, the appearance of an etched or sandblasted substrate is imitated. In order to characterize this visual appearance of a satin-gloss/satinized surface, three variables can be recruited in comparison to etched or sandblasted surfaces: the additional loss of transmission caused by the coating in comparison to an untreated substrate; the HAZE value as a measure of the scattering; and the gloss value (clarity), which is a measure of the reflection. Characteristic and preferred values are 3% to 20% for the loss of transmission as a result of the coating, and HAZE values of around 50% to 97%. The gloss values are less characteristic for the appearance and are situated between 4% and 50%. There is normally an etched or sandblasted reference specimen which is imitated with the coating of the invention. In the case of one preferred embodiment, the substrate material is itself transparent, with a light transmittance Y of >80%. Further preferred here is an embodiment where the opposite side possesses an inorganic coating which is colored with pigments. The interplay of the side which imitates an etched or sandblasted layer and the colored coating shining through produce diverse and appealing design possibilities. Accordingly, the two coatings are preferably not congruent, there instead being areas in which only the colored coating is visible and is not hidden by the coating with imitation etching qualities, or vice versa. Logos and symbols, for operating functions or brand-specific designations, for example, may be integrated into the coating by recessing coatings or by decorating these regions to emphasize them. The drawing of FIG. 2 shows one example of a design.

Advantageous, therefore, is a version where at least one side of the substrate has a coating which is colored with pigments. The underlaying and overlaying of the coating on the other side, as shown, produces diverse design possibilities; the second coating may likewise be colored using pigments, or, without pigments, the appearance of etched or sandblasted surfaces may be imitated, for example. Coatings which develop a metallic appearance as a result of effect pigments or other additives are also possible. By means of additives which lower the refractive index of the layer or diminish the reflection of the surface, layers having demirroring or antireflection properties can be produced.

Where the substrate comprises glass-ceramic panes, it may be advantageous, for example, to decorate one side as usual with enamel colors which comprise pigments, with the heating zones and operating elements being emphasized, and to provide the underside with a colored underside coating. In this case at least one side must possess antisticking properties by addition of structure-forming particles.

In order to achieve particularly opaque or intensely colored coatings, it is advantageous if the structure-forming particles are themselves colored or consist of pigments. As an alternative, the colored layer is also constructed from a plurality of sub-layers. In that case it is advantageous if the first layer has pigments added and the uppermost layer comprises the structure-forming particles for the anti-sticking properties. So that the structure-forming particles do not drop too deep into the underlying layers during heating (e.g., firing), it is advantageous if the softening temperature of the glass powder (layer-forming glass component) in the uppermost layer is lower than the softening temperature of the underlying layer.

In design terms it is also possible for coated regions to be structured and for parts to be left out when coating, or for different coatings, with different pigments, for example, to be combined on one side.

Beneath the structured regions it is possible for display elements or other technical equipment to be integrated into the system, for example. The display elements may consist of monochromatic and polychromatic light sources, usually LEDs, and may light up in different colors such as blue, green, yellow, orange, red, and white. Colored screens/displays are also possible.

In the case of the method for producing a substrate for coating on both sides, a coating having anti-sticking properties is first applied and baked. On heating (e.g., firing), this side lies at the top and has no contact with the underlay. The addition of structure-forming particles forms elevations which act as spacers. In a subsequent step, a coating with or without anti-sticking properties is applied on the opposite side of the substrate and is heated (e.g., baked), with this side likewise lying at the top and having no contact with the underlay. The previously baked coating having anti-sticking properties is in this case situated on the bottom, and produces the contact with the ceramic underlay material, without the coating sticking and being damaged.

The underlays are, customarily, ceramic firing aids such as planar panes of ceramic or of a hard glass such as the SCHOTT product Quarzal (>98 wt % $SiO_2$), for example. These underlay plates are usually produced by sintering and they possess a certain porosity. Alternatively, for example, underlay plates of glass-ceramic may also be used. In heating kilns (e.g., firing kilns) which are equipped with rollers, operation without underlay plates is also possible, with the material for firing being transported directly on the rolls. The rolls usually likewise consist of ceramic, glass-ceramic, glassy or fiber-ceramic materials.

The further operational steps are based on the prior art. The glass powder compositions (layer-forming glass components) are melted in a customary way from raw materials at temperatures of around 1450° C. The glass melts are quenched in water or between cooled metal rollers, and are ground to form a glass powder. The average particle size distribution $d_{50}$ is between 0.5 and 15 μm, preferably between 1 to 4 μm. Dry grinding processes are particularly suitable in order to avoid unwanted formation of agglomerates by the glass powder during drying of the ground slick as necessary in the case of wet grinding.

The resulting glass powders are mixed with the structure-forming particles and, optionally, further pigments, ceramic fillers, and dulling additives. Depending on coating process, different organic auxiliaries are added, which undergo volatilization on heating (e.g., firing). The coating operation may take place dry, by powder electrostatic means or by liquid application, via screen printing, pad printing, wet transfer, spraying or else, more recently, inkjet printing.

Within the invention, the substrates are coated preferably by way of a screen printing process. In that case the powder mixture is brought to the required screen printing viscosity by the addition of a screen printing oil. The resulting paste is homogenized on a triple-roll mill. The mesh size of the sieve used, together with the oil fraction and the powder densities, determines the layer thickness after heating (e.g., firing).

The heating (e.g., firing) of the coatings takes place preferably in a roller kiln in line with the method of the invention. The side with the new coating is at the top, and the pane is transported on resting either directly on the rollers or on the underlay plate in the roller kiln. If the substrate material consists of glass, the heating (e.g. firing) is carried out preferably in a thermal prestressing kiln, in order to raise the strength of the panes. This is the preferred procedure especially for floated soda-lime panes and Borofloat panes.

The second layer-forming material likewise comprises a glass component and consists preferably of an inorganic, glass-based coating, also referred to as enamel.

In a preferred embodiment, the layer materials on both sides of the substrate consist of inorganic, glass-based enamel layers. The advantages described for a glass-based inorganic enamel coating are therefore realized on both sides after firing.

Because the second coating is upward and has no contact with the underlay, there is no absolute need to add structure-forming particles. Average particle sizes of the glass powder are likewise between 0.5 and 15 μm, and the baking temperature must be above the softening temperature. Customary enamel colors or pure glass powders can be used, which are adapted to the substrate.

The softening temperature of the glass component in the second layer is preferably to be at least 500° C. and more preferably at least 600° C. Higher softening temperatures are advantageous for the glass properties, such as chemical resistance, gloss, abrasion and scratch resistance, and thermal stability.

This is preferably also valid for the softening temperature of the glass component in the first layer.

In order to achieve favorable layer properties on both sides, it is advantageous if the softening temperatures of the glass components on both sides of the substrate differ by less than 200° C., preferably less than 100° C.

The softening temperature of the glass component in the second coating is preferably not more than 50° C. above that of the first coating, since otherwise the glass component in the coating overlying or resting on the underlay becomes too liquid and the structure-forming particles are no longer sufficiently fixed. This may lead to flaking of the particles and may jeopardize the avoidance of adhesion. In one advantageous version, the first and second layer-forming materials are the same. This produces logistical advantages.

The coated substrate produced in accordance with the invention or the panel like substrate consisting of thermally prestressed floated soda-lime glass is used preferably as viewing pane in a kitchen oven or as front pane in kitchen appliances or furniture, front pane of electrical appliances and also as pane element in interior and exterior architecture. Examples of these uses are facing panes in baking ovens, vapor extraction hoods, microwave appliances, automatic coffee makers, doors, and shower enclosures.

The coated substrate produced in accordance with the invention or the panel like substrate consisting of floated borosilicate glass may be used preferably as viewing pane in a chimney or kitchen oven or constituent in a safety glass laminate having polymer interlayers. One example of such a substrate is the floated BOROFLOAT® from SCHOT AG, which is available in versions BOROFLOAT® 3.3 and BOROFLOAT® 4.0. In the case of the viewing panes for kitchen ovens, use is made advantageously and in particular of those featuring pyrolysis cleaning.

The coated substrate produced in accordance with the invention or the panel like substrate consisting of LAS glass ceramic may be used preferably as cooking surface or viewing pane in a chimney or kitchen oven and also as cooking surface. The pane is preferably transparent, having a light transmittance of greater than 80%. In the case of the kitchen ovens, those with pyrolysis cleaning are equipped in particular. In the case of use as a cooking surface, the view of the technical internals is prevented by an opaque underside coating, and recesses in the coating allow the introduction of displays and indicators.

The present invention is further illustrated by the examples below.

For production of the glass powder for the layer-forming glass component, the glass compositions, composed of raw materials customary in the glass industry, were melted in platinum crucibles at temperatures of around 1450° C. for 4 hours and homogenized by stirring. The glass melts are quenched between water-cooled stainless steel rolls, and the pieces of glass obtained are ground further to an average particle size $d_{50}$ of 1.5 µm.

For the glasses, Table 1 lists compositions and properties such as density, transformation temperature Tg, softening temperature Ew, and the thermal expansion between 20° C. and 300° C.

Table 2 shows examples of structure-forming particles, their manufacturers and properties. For certain examples, organic or semi-organic precursors of $SiO_2$ beads (particle no. 1, 3 from table 2) were used. As shown in table 3, these were in part heated beforehand (comment "calcined" in tab. 3) in order to remove the organic constituents. In the treatment, the beads were heated in a ceramic dish in an oven at 400° C. for 30 minutes and held for 16 hours. The bed height of the beads in the ceramic dish was 1 cm, in order to ensure good access by oxygen.

Table 3 shows examples of inventive methods and substrates and comparative examples 23 to 26. The substrate materials used, in addition to commercial floated soda-lime glass panes and floated borosilicate glass panes (e.g. BOROFLOAT® 3.3 from SCHOT AG), also included glass-ceramic panes and green glass panes (which can be converted into glass-ceramic panes). Examples of transparent lithium aluminum silicate glass-ceramic panes, an example being the glass-ceramic 8732 from SCHOTT AG, are disclosed in specification DE 10 2012 202 697 A1.

For comparative purposes (example 26), a pane of soda-lime glass etched with hydrofluoric acid with its surface was contrasted. In the case of comparative example 25, the first layer was formed without structure-forming particles. In the laboratory test, a strong adhesion to the underlay plate materials is in evidence. Parts of the enamel layer have been extracted from the substrate and adhere to the underlay. With the high-quartz glass-ceramic as underlay, furthermore, the coated substrate exhibits cracking. Comparative examples 23 and 24 contain beads of $SiO_2$ with a small average size of 0.35 µm. On account of their small size, they are more easily surrounded and embedded by the layer-forming glass component. Accordingly, with the average glass layer thickness realized here, of greater than 1 µm, between the particles, they are not effective as an elevation. Additions of this size are used for reducing the reflection and demirroring as in the case of the second layer of example 22. In the case of the sensitive NEXTREMA® transparent underlay, the addition of 0.3 vol % of structure-forming particles in comparative example 23 was not enough to avoid damage entirely.

The substrate materials listed, in the form of panes with dimensions of 340×240×4 mm, were prepared for the coatings. This size is suitable for firing operations both in a laboratory oven and in a production kiln. The powders for the two coatings were mixed as per table 3, and screen printing oil was added. First of all here the glass powder and any pigment was mixed with the screen printing oil and homogenized in a triple-roll mill. Then the structure-forming particles were added and the paste was mixed in a Dispermat by stirring. The pasting ratio and the screen fabric determine the layer thickness on screen printing. The substrates were printed over the full area and dried at 180° C. for 30 minutes.

The firings with the stated maximum temperatures and holding times took place as indicated in the laboratory or production kiln. In the case of laboratory firing, a chamber kiln with a sintered silica glass underlay plate was heated to the specified temperature and the coated pane was inserted. After the stated holding time, the substrate with fired coating was taken out hot and relaxed in a second chamber kiln at 540° C. for 15 minutes and cooled to room temperature. When the first layer was fired, it lay on the top without contact with the underlay.

Before the second layer was fired, the effectiveness of the first layer in terms of avoidance of adhesion/anti-sticking was tested. For this purpose, the coated substrates were divided into sections measuring about 5×5 cm, which were heated with the first, fired layer downward on different underlays in the laboratory kiln to 680° C. in 40 minutes, with a holding time of 5 minutes. Cooling took place at 10° C./min to 300° C. and then with the furnace characteristic line. Testing was carried out on five different underlay plate materials: sintered silica glass, QUARZAL, Isoplan 1000, Frenzelit, keatite glass-ceramic, rolled surface, keatite glass-ceramic, sandblasted surface, high-quartz glass-ceramic, rolled surface.

The keatite glass-ceramic underlay used was NEXTREMA® opaque white glass-ceramic from SCHOTI AG and the high-quartz glass-ceramic used was NEXTREMA® transparent. In examples 1 and 2 from table 3, the first four underlay plate materials were used in the test. All further examples were tested with QUARZAL and NEXTREMA® transparent. It was found that the last material reacts particularly sensitively in respect of sticking and is therefore highly suitable for the test. The first material, QUARZAL is advantageous for statements concerning sintered underlay plate materials. In the absence of damage by bonding or sticking to any of the underlay plate materials, the substrates with the coatings were released for second firing on a laboratory or production basis.

The second layer-forming material comprises a black pigment, which was applied over the full area of the second side of the substrate by screen printing and fired. Marginal regions of the substrate were printed without opposing layers.

The production kilns were roller kilns in which the substrate is transported on ceramic rollers. In the case of the substrate materials made of glass, production kilns were used preferably where the glass substrate was thermally prestresssed after the second layer had been baked. The evaluation of the bottom first coating for quality (no damage, flaked layer regions) shows the effectiveness of the method of the invention (see table 3).

Table 3 also shows the surface structures of the layers with structure-forming particles, such as particle spacing and particle elevations, for example, and also glass layer thickness and degrees of surface occupation. These parameters were obtained from light micrographs and electron micrographs of the layers in straight-on view and transversely at fracture edges. This evaluation took place at a number of different locations on the sample (10 regions in total). FIG. 1 shows an electron micrograph of the fracture edge of the substrate with the first layer, comprising the structure-forming particles, from example 4 in table 3.

The roughness values of the layers were determined using a white light interferometer from Zygo. The rectangular measurement area was optimized in line with the respective surface structure, the edge lengths of the rectangle being set at 200 to 600 μm.

The optical parameters of transmittance, HAZE, and gloss were determined using the Haze-gard Plus instrument from BYK Gardner in accordance with standards ASTM D-1003 and ASTM D-1044. Measurement is carried out on those regions of the substrate or prepared sections which possess only the first coating, without being back-printed with the second layer.

FIG. 2 shows a panel like substrate having layers applied on both sides, looking at the side bearing the first coating. The first layer contains structure-forming particles and there are substrate regions in which the second layer is back-printed (2a) and those in which the substrate has no second coating on the opposing side (2b). In region 1 of the substrate and in the company logo, only the second coating is applied, and the region (3) is without coating on both sides. The picture shows the diverse possibilities for design implementation.

In one example the version according to FIG. 2 is a soda-lime glass pane 4 mm thick for use as a baking oven viewing pane having a first layer, in accordance with example 8, which conforms to the appearance of an etched surface, and the second coating conforms likewise to example 8 with a black-pigmented enamel layer. The pane is thermally prestressed in the production kiln, and the testing of the strength in the crumb fracture test satisfies the requirements of DIN EN 60335-2-6 after a crumb count of greater than 60 crumbs in an arbitrary area of 50×50 mm.

In a further example, a BOROFLOAT® 3.3 pane 4 mm thick is printed on both sides, in accordance with example 19 from table 3, in the embodiment shown.

TABLE 1

Compositions of glasses and properties of the glasses from which the glass powders were obtained

| Composition | wt %. | Glass No. 1 | 2 | 3 | 4 | 5 |
|---|---|---|---|---|---|---|
| $Li_2O$ | | 1.3 | 4.0 | | 3.1 | 4.4 |
| $Na_2O$ | | | 10.0 | 18.8 | | 0.2 |
| $K_2O$ | | 0.5 | | 0.0 | | |
| MgO | | 0.1 | 1.0 | | 1.7 | |
| CaO | | 0.2 | 3.0 | 0.9 | 2.0 | |
| SrO | | | | | 2.3 | |
| BaO | | | | | | |
| ZnO | | 0.1 | 8.0 | 8.5 | 2.2 | |
| $B_2O_3$ | | 7.2 | 18.0 | 13.1 | 16.7 | 23.1 |
| $Al_2O_3$ | | 3.3 | 5.0 | 1.0 | 16.6 | 5.9 |
| $SiO_2$ | | 21.2 | 50.0 | 50.9 | 54.3 | 57.0 |
| $P_2O_5$ | | | | | | |
| $TiO_2$ | | 0.1 | 1.0 | 6.3 | | |
| $ZrO_2$ | | 2.0 | | 0.5 | 1.1 | |
| $SnO_2$ | | | | | | |
| $Bi_2O_3$ | | 64.0 | | | | 9.4 |
| Properties glassy | | | | | | |
| Transformation temperature | °C. | 445 | 490 | 536 | 578 | 478 |
| Softening temperature Ew ($10^{7.6}$ dPas) | °C. | 548 | 594 | 644 | 755 | 698 |
| Thermal expansion $\alpha_{20/300}$ | $10^{-6}$ K | 7.3 | 8.6 | 9.70 | 4.4 | 4.8 |
| Density | g/cm³ | 4.52 | 2.48 | 2.69 | 2.41 | 2.43 |

TABLE 2

Examples of structure-forming particles, manufacturers and properties

| Particle No. | Material | Designation | Manufacturer | Particle form | Average Size (μm) |
|---|---|---|---|---|---|
| 1 | Polymethylsilsesquioxane | Tospearl 145 A | Momentive Performance Materials GmbH | Spheres | 4.5 |

TABLE 2-continued

Examples of structure-forming particles, manufacturers and properties

| Particle No. | Material | Designation | Manufacturer | Particle form | Average Size (µm) |
|---|---|---|---|---|---|
| 2 | Polymethylsilsesquioxane | E+580 | Coating Products | Spheres | 8 |
| 3 | Polymethylsilsesquioxane | E+715 | Coating Products | Spheres | 15 |
| 4 | Low-alkali borosilicate glass | W 210 | 3M | Spheres | 3 |
| 5 | Alkali aluminosilicate glass | W 410 | 3M | Spheres | 4 |
| 6 | Aluminum oxide | Alumina microbeads | RSA LE RUBIS SA | Spheres | 50 |
| 7 | Ceramic ($SiO_2$—$Al_2O_3$) | Zeeospheres ceramic microspheres, Grade G-200 | Zeeospheres Ceramics, LLC | Spheres | 5 |
| 8 | Ceramic ($SiO_2$—$Al_2O_3$) | Zeeospheres ceramic microspheres, Grade N-400 | Zeeospheres Ceramics, LLC | Spheres | 8 |
| 9 | α-Aluminum oxide | Plain $Al_2O_3$ microspheres, C-ALU-3.5 | Microspheres-Nanospheres, Corpuscular Inc. | Spheres | 4 |
| 10 | Titanium dioxide | Plain $TiO_2$ microspheres, C-TIO-5 | Microspheres-Nanospheres, Corpuscular Inc. | Spheres | 5 |
| 11 | Borosilicate glass | Spheriglass Solid Glass Microsperes, Grade 500 | Potters Industries LLC | Spheres | 5 |
| 12 | Lithium aluminum silicate glass-ceramic | Negative CTE filler, DL-7300, standard size | Nippon Electric Glass CO, Ltd. | Spheres | 4 |
| 13 | Lithium aluminum silicate glass-ceramic | Negative CTE filler, DL-7400, standard size | Nippon Electric Glass CO, Ltd. | Spheres | 4 |
| 14 | Zirconium silicate | Finely ground zirconium silicate | Europe Minerals | Grain form | 3 |
| 15 | Colloidal $SiO_2$ | Quartron SP-03F | Fuso Chemicals CO., Ltd. | Spheres | 0.35 |
| 16 | Colloidal $SiO_2$ | Quartron PL-20 | Fuso Chemicals CO., Ltd. | Spheres | 0.22 |
| 17 | Soda-lime glass | Unibeads SPL-30 | Unitika Ltd. | Spheres | 30 |
| 18 | Titanium barium glass | Unibeads SPM-16 | Unitika Ltd. | Spheres | 16 |
| 19 | Low-alkali glass | EMB-20 | Potters-Ballotini Co., Ltd. | Spheres | 10 |

TABLE 3

Examples of inventive coatings and comparative examples, production conditions and properties

| Example | | 1 | 2 | 3 | 4 |
|---|---|---|---|---|---|
| Substrate | | Transparent floated soda-lime glass | Transparent floated soda-lime glass | Transparent floated soda-lime glass | Transparent floated soda-lime glass |
| Composition powder first layer | vol % | | | | |
| Glass (glass number from table 1) | | 1 (56 vol %) | 2 (54 vol %) | 2 (44 vol %) | 5 (54 vol %) |

TABLE 3-continued

Examples of inventive coatings and comparative examples, production conditions and properties

| | | | | | |
|---|---|---|---|---|---|
| Particle (particle number from table 2) Pigments Additives | | 1 (44 vol %) | 1 (46 vol %) | 3 (56 vol %) | 1 (46 vol %) |
| Coating | | Screen printing | Screen printing | Screen printing | Screen printing |
| Medium pasting ratio (powder:organic) | wt % | 10:5 (wt %) | 10:20 (wt %) | 10:25 (wt %) | 10:20 (wt %) |
| Sieve fabric | | 140 | 180 | 140 | 180 |
| First firing | | Laboratory kiln | Laboratory kiln | Laboratory kiln | Laboratory kiln |
| Firing conditions temperature/ time | ° C./min | 680/15 | 680/15 | 680/15 | 680/15 |
| Composition powder second layer | vol % | | | | |
| Glass Particles | | 3 (70 vol %) | 3 (70 vol %) | 3 (70 vol %) | 3 (70 vol %) |
| Pigment | | Cu—Cr-spinels (30 vol %) | Cu—Cr-spinels (30 vol %) | Cu—Cr-spinels (30 vol %) | Cu—Cr-spinels (30 vol %) |
| Additives Coating | | Screen printing | Screen printing | Screen printing | Screen printing |
| Medium pasting ratio (powder:organic) | wt % | 55:45 (wt %) | 55:45 (wt %) | 55:45 (wt %) | 55:45 (wt %) |
| Screen fabric | | 110 | 110 | 110 | 110 |
| Second firing | | Production kiln | Production kiln | Laboratory kiln | Production kiln |
| Firing conditions temperature/ time | ° C./min | 720/1.5 | 721/1.5 | 690/15 | 680/3 |
| Properties of the double-sidedly coated substrate | | | | | |
| Adhesion/ damage to the first layer | | Laboratory and production test passed | Laboratory and production test passed | Laboratory test passed | Laboratory and production test passed |
| Average particle spacing first layer | (μm) | 2.3 | 3.5 | 12.0 | 2.0 |
| Average elevation of particles from first layer | (% of particle diameter) | 19 | 48 | 19 | 47 |
| Average thickness glass layer between particles | (μm) | 2.6 | 3.0 | 2.6 | 1.7 |
| Degree of surface occupancy particles first layer | (Area %) | 54 | 30 | 17 | 19 |
| Roughness of the first layer | | | | | |
| $R_a$ [μm] | (μm) | 1.3 | 0.8 | 1.2 | 0.6 |
| PV [μm] | (μm) | 17.2 | 16.7 | 20.8 | 14.2 |
| Skewness $R_{sk}$ | | −0.1 | 0.4 | 2.9 | 1.0 |
| Optical properties first layer | | | | | |
| Transmittance | (%) | 19.6 | 77.6 | 84.4 | 61.4 |
| Haze | | >99 | 89.5 | 46.7 | 82.4 |
| Gloss | (%) | 90.9 | 14.0 | 79.5 | 43.6 |

TABLE 3-continued

Examples of inventive coatings and comparative examples, production conditions and properties

| Example | | 5 | 6 | 7 | 8 |
|---|---|---|---|---|---|
| Substrate | | | Transparent floated soda-lime glass | Transparent floated soda-lime glass | Transparent floated soda-lime glass | Transparent floated soda-lime glass |
| Composition powder first layer | vol % | | | | |
| Glass (glass number from table 1) | | | 3 (54 vol %) | 5 (64 vol %) | 5 (66 vol %) | 5 (68 vol%) |
| Particle (particle number from table 2) | | | 1 (46 vol %) | 1 (36 vol %) calcined | 1 (34 vol %) calcined | 1 (32vol%) calcined |
| Pigments | | | | | | |
| Additives | | | | | | |
| Coating | | | Screen printing | Screen printing | Screen printing | Screen printing |
| Medium pasting ratio (powder:organic) | wt % | | 10:20 (wt %) | 10:19 (wt %) | 10:17 (wt %) | 10:16 (wt%) |
| Screen fabric | | | 180 | 180 | 180 | 180 |
| First Firing | | | Laboratory kiln | Laboratory kiln | Laboratory kiln | Laboratory kiln |
| Firing conditions temperature/time | °C./min | | 680/15 | 680/15 | 680/15 | 680/15 |
| Composition powder second layer | vol % | | | | | |
| Glass | | | 3 (70 vol %) | 3 (70 vol %) | 3 (70 vol %) | 3 (70 vol %) |
| Particles | | | | | | |
| Pigments | | | Cu—Cr-spinels (30 vol %) | Cu—Cr-spinels (30 vol %) | Cu—Cr-spinels (30 vol %) | Cu—Cr-spinels (30 vol %) |
| Additives | | | | | | |
| Coatings | | | Screen printing | Screen printing | Screen printing | Screen printing |
| Medium pasting ratio (powder:organic) | wt % | | 55:45 (wt %) | 55:45 (wt %) | 55:45 (wt %) | 55:45 (wt %) |
| Screen fabric | | | 110 | 110 | 110 | 110 |
| Second firing | | | Production kiln | Laboratory kiln | Laboratory kiln | Laboratory kiln |
| Firing conditions temperature/time | °C./min | | 680/3 | 690/15 | 690/15 | 690/15 |
| Properties of the double-sidedly coated substrate | | | | | | |
| Adhesion/damage of the first layer | | | Laboratory and production test passed | Laboratory test passed | Laboratory test passed | Laboratory test passed |
| Average particle spacing first layer | (µm) | | 2.0 | 2.5 | 2.5 | 2.5 |
| Average elevation of particles from first layer | (% of particle diameter) | | 38 | 28 | 19 | 13 |
| Average thickness glass layer between particles | (µm) | | 2.0 | 2.3 | 2.6 | 2.8 |

TABLE 3-continued

Examples of inventive coatings and comparative examples, production conditions and properties

| | | | | | |
|---|---|---|---|---|---|
| Degree of surface occupancy particles first layer | (Area %) | 20 | 18 | 19 | 18 |
| Roughness of the first layer | | | | | |
| $R_a$ [µm] | (µm) | 0.8 | 0.3 | 0.4 | 0.4 |
| PV [µm] | (µm) | 7.6 | 6.6 | 5.1 | 6.8 |
| Skewness $R_{sk}$ | | 0.3 | 0.9 | 0.7 | 0.7 |
| Optical properties | | | | | |
| Transmittance | | 62.9 | 77.9 | 79.5 | 80.5 |
| Haze | | 95.2 | 51.2 | 57.4 | 59.4 |
| Gloss | | 7.1 | 70.7 | 59.0 | 48.7 |

| Examples | | 9 | 10 | 11 | 12 |
|---|---|---|---|---|---|
| Substrate | | Transparent floated soda-lime glass | Transparent floated soda-lime glass | Transparent floated soda-lime glass | Transparent floated soda-lime glass |
| Composition powder first layer | vol % | | | | |
| Glass (glass number from table 1) | | 5 (65 vol %) | 5 (59 vol %) | 5 (56 vol %) | 5 (95 vol %) |
| Particle (particle number from table 2) | | 1 (35 vol %), calcined | 1 (41 vol %), calcined | 1 (44 vol %), calcined | 1 (5 vol %), calcined |
| Pigments | | | | | |
| Additives | | | | | |
| Coating | | Screen printing | Screen printing | Screen printing | Screen printing |
| Medium pasting ratio (powder:organic) | wt % | 10:23 (wt %) | 10:29 (wt %) | 10:18 (wt %) | 10:20 (wt %) |
| Screen fabric | | 180 | 180 | 180 | 180 |
| First firing | | Laboratory kiln | Laboratory kiln | Laboratory kiln | Laboratory kiln |
| Firing conditions temperature/ time | ° C./min | 680/15 | 680/15 | 680/15 | 680/15 |
| Composition powder second layer | vol % | | | | |
| Glass | | 3 (70 vol %) | 3 (70 vol %) | 3 (70 vol %) | 3 (70 vol %) |
| Particles | | | | | |
| Pigments | | Cu—Cr-spinels (30 vol %) | Cu—Cr-spinels (30 vol %) | Cu—Cr-spinels (30 vol %) | Cu—Cr-spinels (30 vol %) |
| Additives | | | | | |
| Coating | | Screen printing | Screen printing | Screen printing | Screen printing |
| Medium pasting ratio (powder:organic) | wt % | 55:45 (wt %) | 55:45 (wt %) | 55:45 (wt %) | 55:45 (wt %) |
| Screen fabric | | 110 | 110 | 110 | 110 |
| Second firing | | Laboratory kiln | Laboratory kiln | Laboratory kiln | Laboratory kiln |
| Firing conditions temperature/ time | ° C./min | 690/15 | 690/15 | 690/15 | 690/15 |
| Properties of the double-sidedly coated substrate | | | | | |
| Adhesion/ damage of the first layer | | Laboratory test passed | Laboratory test passed | Laboratory test passed | Laboratory test passed |
| Average particle spacing first layer | (µm) | 3.0 | 2.7 | 2.0 | 10.0 |

TABLE 3-continued

Examples of inventive coatings and comparative examples, production conditions and properties

| | | | | | |
|---|---|---|---|---|---|
| Average elevation of particles from first layer | (% of particle diameter) | 41 | 38 | 38 | 53 |
| Average thickness glass layer between particles | (µm) | 1.9 | 2.0 | 2.0 | 1.5 |
| Degree of surface occupancy particles first layer | (Area %) | 15 | 20 | 21 | 3.5 |
| Roughness of the first layer | | | | | |
| $R_a$ [µm] | (µm) | 0.3 | 0.4 | 0.4 | 0.3 |
| PV [µm] | (µm) | 4.4 | 5.3 | 5.2 | 3.2 |
| Skewness $R_{sk}$ | | 1.1 | 0.7 | 0.5 | 1.5 |
| Optical properties first layer | | | | | |
| Transmittance | | 79.5 | 79.0 | 79.9 | 85.7 |
| Haze | | 42.4 | 57.4 | 65.1 | 21.7 |
| Gloss | | 76.6 | 67.5 | 55.6 | 77.1 |

| Example | | 13 | 14 | 15 | 16 |
|---|---|---|---|---|---|
| Substrate | | Transparent floated soda-lime glass | Transparent floated soda-lime glass | Transparent floated soda-lime glass | Transparent floated soda-lime glass |
| Composition powder first layer | vol % | | | | |
| Glass (glass number from table 1) | | 5 (20 vol %) | 5 (99 vol %) | 5 (99.7 vol %) | 5 (54 vol %) |
| Particle (particle number from table 2) | | 1 (80 vol %) calcined | 1 (1 vol %), calcined | 1 (0.3 vol %) calcined | 12 (46 vol %) |
| Pigments | | | | | |
| Additives | | | | | |
| Coating | | Screen printing | Screen printing | Screen printing | Screen printing |
| Medium pasting ratio (powder:organic) | wt % | 10:20 (wt %) | 10:20 (wt %) | 10:20 (wt %) | 10:20 (wt %) |
| Screen fabric | | 180 | 180 | 180 | 180 |
| First firing | | Laboratory kiln | Laboratory kiln | Laboratory kiln | Laboratory kiln |
| Firing conditions temperature/time | ° C./min | 680/15 | 680/15 | 680/15 | 680/15 |
| Composition powder second layer | vol % | | | | |

TABLE 3-continued

Examples of inventive coatings and comparative examples, production conditions and properties

| | | | | | |
|---|---|---|---|---|---|
| Glass Particles | | 3 (70 vol %) | 3 (70 vol %) | 3 (70 vol %) | 3 (70 vol %) |
| Pigments | | Cu—Cr-spinels (30 vol %) | Cu—Cr-spinels (30 vol %) | Cu—Cr-spinels (30 vol %) | Cu—Cr-spinels (30 vol %) |
| Additives | | | | | |
| Coating | | Screen printing | Screen printing | Screen printing | Screen printing |
| Medium pasting ratio (powder:organic) | wt % | 55:45 (wt %) | 55:45 (wt %) | 55:45 (wt %) | 55:45 (wt %) |
| Screen fabric | | 110 | 110 | 110 | 110 |
| Second firing | | Laboratory kiln | Laboratory kiln | Laboratory kiln | Laboratory kiln |
| Firing conditions temperature/time | °C./min | 690/15 | 690/15 | 690/15 | 690/15 |
| Properties of the double-sidedly coated substrate | | | | | |
| Adhesion/damage of the first layer | | Laboratory test passed | Laboratory test passed | Laboratory test passed | Laboratory test passed |
| Average particle spacing first layer | (μm) | 1.6 | 42.0 | 67.0 | 5.0 |
| Average elevation of particles from first layer | (% of particle diameter) | 53 | 63 | 59 | 59 |
| Average thickness of glass layer between particles | (μm) | 1.5 | 1.2 | 1.3 | 1.3 |
| Degree of surface occupancy particles first layer | (Area %) | 35 | 1.30 | 0.80 | 38 |
| Roughness of the first layer | | | | | |
| $R_a$ [μm] | (μm) | 0.5 | 0.2 | 0.1 | 0.5 |
| PV [μm] | (μm) | 6.1 | 3.7 | 3.3 | 10.1 |
| Skewness $R_{sk}$ | | 0.4 | 0.8 | 0.4 | 2.5 |
| Optical properties first layer | | | | | |
| Transmittance | | 63.3 | 84.3 | 84.0 | 76.2 |
| Haze | | 78.1 | 8.1 | 7.5 | 84.8 |
| Gloss | | 65.3 | 83.1 | 84.5 | 52.4 |

| Example | | 17 | 18 | 19 | 20 |
|---|---|---|---|---|---|
| Substrate | | Crystallizable starting glass transparent LAS glass-ceramic 8732 from SCHOTT | Transparent LAS glass-ceramic 8732 from SCHOTT | Borofloat 33 | Transparent floated soda-lime glass |
| Composition powder first layer | vol % | | | | |
| Glass (glass number from table 1) | | 5 (54 vol %) | 5 (54 vol %) | 5 (54 vol %) | 5 (29 vol %) |
| Particles (particle number from table 2) | | 12 (46 vol %) | 12 (46 vol %) | 12 (46 vol %) | 1 (46 vol %) calcined |

TABLE 3-continued

Examples of inventive coatings and comparative examples, production conditions and properties

| | | | | | |
|---|---|---|---|---|---|
| Pigments | | | | | $TiO_2$ (25 vol %) |
| Additives | | | | | |
| Coating | | Screen printing | Screen printing | Screen printing | Screen printing |
| Medium pasting ratio (powder:organic) | wt % | 10:20 (wt %) | 10:20 (wt %) | 10:20 (wt %) | 10:20 (wt %) |
| Screen fabric | | 180 | 180 | 180 | 180 |
| First firing | | Laboratory kiln | Laboratory kiln | Laboratory kiln | Laboratory kiln |
| Firing conditions temperature/time | ° C./min | 680/15 | 680/15 | 680/15 | 680/15 |
| Composition powder second layer | vol % | | | | |
| Glass Particles | | 3 (70 vol %) | 3 (70 vol %) | 3 (70 vol %) | 3 (70 vol %) |
| Pigments | | Cu—Cr-spinels (30 vol %) | Cu—Cr-spinels (30 vol %) | Cu—Cr-spinels (30 vol %) | Cu—Cr-spinels (30 vol %) |
| Additives | | | | | |
| Coating | | Screen printing | Screen printing | Screen printing | Screen printing |
| Medium pasting ratio (powder:organic) | wt % | 55:45 (wt %) | 55:45 (wt %) | 55:45 (wt %) | 55:45 (wt %) |
| Screen fabric | | 110 | 110 | 110 | 110 |
| Second firing | | Laboratory kiln | Laboratory kiln | Laboratory kiln | Laboratory kiln |
| Firing conditions temperature/time | ° C./min | 690/15 | 690/15 | 690/15 | 690/15 |
| Properties of the double-sidedly coated substrate | | | | | |
| Sticking/damage to first layer | | Laboratory test passed | Laboratory test passed | Laboratory test passed | Laboratory test passed |
| Average particle spacing first layer | (µm) | 5.0 | 5.0 | 5.0 | 4.0 |
| Average elevation of particles from first layer | (% of particle diameter) | 59 | 59 | 59 | 66 |
| Average thickness of glass layer between particles | (µm) | 1.3 | 1.3 | 1.3 | 1.1 |
| Degree of surface occupancy particles first layer | (Area %) | 38 | 38 | 38 | 26 |
| Roughness of first layer | | | | | |
| $R_a$ [µm] | (µm) | 0.7 | 0.7 | 0.6 | 0.6 |
| PV [µm] | (µm) | 11.2 | 10.0 | 12 | 8.0 |
| Skewness $R_{sk}$ | | 1.8 | 1.4 | 1.7 | 0.9 |
| Optical properties first layer | | | | | |
| Transmittance | | 72.6 | 71.0 | 78.7 | 43.7 |
| Haze | | 98.3 | 92.2 | 89 | >99 |
| Gloss | | 26.4 | 40.1 | 27.8 | 30.5 |

TABLE 3-continued

Examples of inventive coatings and comparative examples, production conditions and properties

| Example | | 21 | 22 | 23 | 24 |
|---|---|---|---|---|---|
| Substrate | | Transparent floated soda-lime glass | Transparent floated soda-lime glass | Transparent floated soda-lime glass | Transparent floated soda-lime glass |
| Composition powder first layer | vol % | | As Example 20 | | |
| Glass (glass number from table 1) | | 5 (54 vol %) | 5 (29 vol %) | 5 (97.7 vol %) | 5 (98 vol %) |
| Particles (particle number from table 2) | | 14 (46 vol %) | 1 (46 vol %) calcined | 1 (0.3 vol %) calcined | 15 (2 vol %) |
| Pigments | | | $TiO_2$ (25 vol %) | | |
| Additives | | | | 15 (2 vol %) | |
| Coating | | Screen printing | Screen printing | Screen printing | Screen printing |
| Medium pasting ratio (powder:organic) | wt % | 10:20 (wt %) | 10:20 (wt %) | 10:20 (wt %) | 10:24 (wt %) |
| Screen fabric | | 180 | 180 | 180 | 180 |
| First firing | | Laboratory kiln | Laboratory kiln | Laboratory kiln | Laboratory kiln |
| Firing conditions temperature/time | °C./min | 680/15 | 680/15 | 680/15 | 680/15 |
| Composition powder second layer | vol % | | | | |
| Glass | | 3 (70 vol %) | 5 (98 vol %) | | |
| Particles | | | 15 (2 vol %) | | |
| Pigments | | Cu—Cr-spinels (30 vol %) | | | |
| Additives | | | | | |
| Coating | | Screen printing | Screen printing | | |
| Medium pasting ratio (powder:organic) | wt % | 55:45 (wt %) | 10:24 (wt %) | | |
| Screen fabric | | 110 | 180 | | |
| Second firing | | Laboratory kiln | Laboratory kiln | | |
| Firing conditions temperature/time | °C./min. | 690/15 | 680/15 | | |
| Properties of the double-sidedly coated substrate | | | First layer as Ex. 20 | | |
| Adhesion/damage to first layer | | Laboratory test passed | Laboratory test passed | Damage to layer, laboratory test not passed | Severe damage to layer, laboratory test not passed |
| Average particle spacing first layer | (μm) | 5.0 | | | |
| Average elevation of particles from first layer | (% of particle diameter) | 66 | | | |
| Average thickness of glass layer between particles | (μm) | 1.1 | | | |
| Degree of surface occupancy particles first layer | (Area %) | 20 | | | |
| Roughness of first layer | | | | | |

TABLE 3-continued

Examples of inventive coatings and comparative examples, production conditions and properties

| | | |
|---|---|---|
| $R_a$ [μm] | (μm) | 0.5 |
| PV [μm] | (μm) | 10.4 |
| Skewness-wert $R_{sk}$ | | 4.4 |
| Optical properties first layer | | |
| Transmittance | | 72.5 |
| Haze | | 61.0 |
| Gloss | | 78.9 |

| Example | | 25 | 26 |
|---|---|---|---|
| Substrate | | Transparent floated soda-lime glass | Transparent floated soda-lime glass, surface etched with hydrofluoric acid |
| Composition powder first layer | vol % | | |
| Glass (glass number from table 1) | | 5 (100 vol %) | |
| Particles (particle number from table 2) | | | |
| Pigments | | | |
| Additives | | | |
| Coating | | Screen printing | |
| Medium pasting ratio (powder:organic) | wt % | 10:20 (wt %) | |
| Screen fabric | | 77 | |
| First firing | | Laboratory kiln | |
| Firing conditions temperature/time | ° C./min | 680/15 | |
| Composition powder second layer | vol % | | |
| Glass | | | |
| Particles | | | |
| Pigments | | | |
| Additives | | | |
| Coating | | | |
| Medium pasting ratio (powder:organic) | wt % | | |
| Screen fabric | | | |
| Second firing | | | |
| Firing conditions temperature/time | ° C./min | | |
| Properties of the double-sidedly coated substrate | | | |
| Sticking/damage to the first layer | | Severe damage to the layer, laboratory test not passed | |
| Average particle spacing first layer | (μm) | | |
| Average elevation of particles from first layer | (% of particle diameter) | | |

TABLE 3-continued

Examples of inventive coatings and comparative examples, production conditions and properties

| | | | | | |
|---|---|---|---|---|---|
| Average thickness of glass layer between particles | (μm) | | | | |
| Degree of surface occupancy particles first layer | (Area %) | | | | |
| Roughness of the first layer | | | | | |
| $R_a$ [μm] | (μm) | | | | 1.8 |
| PV [μm] | (μm) | | | | 13.9 |
| Skewness $R_{sk}$ | | | | | −0.2 |
| Optical properties first layer | | | | | |
| Transmittance | | | | | 87.8 |
| Haze | | | | | 94.6 |
| Gloss | | | | | 5.9 |

| Example | | 27 | 28 | 29 | 30 |
|---|---|---|---|---|---|
| Substrate | | Transparent floated soda-lime glass | Transparent floated soda-lime glass | Transparent floated soda-lime glass | Transparent floated soda-lime glass |
| Composition powder first layer | vol % | | | | |
| Glass (glass number from table 1) | | 3 (50 vol %) | 3 (55 vol %) | 3 (65 vol %) | 3 (62 vol %) |
| Particles (particle number from table 2) | | 2 (5 vol %) 3 (45 vol %) | 2 (5 vol %) 3 (40 vol %) | 2 (5 vol %) 3 (30 vol %) | 2 (5 vol %) |
| Pigments | | | | | Cu—Cr-spinels (33 vol %) |
| Additives | | | | | |
| Coating | | Screen printing | Screen printing | Screen printing | Screen printing |
| Medium pasting ratio (powder:organic) | wt % | 10:20 (wt %) | 10:20 (wt %) | 10:20 (wt %) | 10:20 (wt %) |
| Screen fabric | | 100 | 100 | 100 | 100 |
| First firing | | Laboratory kiln | Laboratory kiln | Laboratory kiln | Laboratory kiln |
| Firing conditions temperature/time | ° C./min | 680/15 | 680/15 | 680/15 | 680/15 |
| Composition powder second layer | vol % | | | | |
| Glass | | 3 (75 vol %) | 3 (75 vol %) | 3 (75 vol %) | 3 (75 vol %) |
| Particles | | | | | |
| Pigments | | Cu—Cr-spinels (25 vol %) | Cu—Cr-spinels (25 vol %) | Cu—Cr-spinels (25 vol %) | Cu—Cr-spinels (25 vol %) |
| Additives | | | | | |
| Coating | | Screen printing | Screen printing | Screen printing | Screen printing |
| Medium pasting ratio (powder:organic) | wt % | 55:45 (wt %) | 55:45 (wt %) | 55:45 (wt %) | 55:45 (wt %) |

TABLE 3-continued

Examples of inventive coatings and comparative examples, production conditions and properties

| | | | | | |
|---|---|---|---|---|---|
| Screen fabric | | 110 | 110 | 110 | 110 |
| Second firing | | Laboratory kiln | Laboratory kiln | Laboratory kiln | Laboratory kiln |
| Firing conditions temperature/time | °C./min | 690/15 | 690/15 | 690/15 | 690/15 |
| Properties of the double-sidedly coated substrate | | | | | |
| Sticking/damage to first layer | | Laboratory and production test passed | Laboratory and production test passed | Laboratory and production test passed | Laboratory test passed |
| Average particle spacing first layer | (μm) | 4.0 | 4.5 | 4.5 | 5.0 |
| Average elevation of particles from first layer | (% of particle diameter) | 50 (particle 2) 14 (particle 3) | 50 (particle 2) 14 (particle 3) | 50 (particle 2) 14 (particle 3) | 50 |
| Average thickness of glass layer between particles | (μm) | 6.0 | 6.0 | 6.0 | 5.5 |
| Degree of surface occupancy particle first layer | (area %) | 50 | 45 | 42 | 45 |
| Roughness of the first layer | | | | | |
| $R_a$ [μm] | (μm) | 0.6 | 0.6 | 0.6 | 0.4 |
| PV [μm] | (μm) | 23.0 | 20.0 | 20.0 | 25.0 |
| Skewness $R_{sk}$ | | 2.6 | 5.0 | 5.0 | 4.6 |
| Optical properties first layer | | | | | |
| Transmittance | | 79.9 | 82.0 | 84.5 | 62.0 |
| Haze | | 65.1 | 62.0 | 58.5 | >99 |
| Gloss | | 7.0 | 8.5 | 9.2 | 7.5 |

What is claimed is:

1. A method for producing a coated substrate, comprising the steps of:
   providing a panel like substrate having a first side and a second side, the second side being opposite the first side;
   applying a first layer-forming material to the first side, the first layer-forming material comprising a glass powder and particles, the particles producing elevations in the first layer-forming material;
   heating the substrate having the first layer-forming material to provide a first layer with elevations;
   applying a second layer-forming material to the second side;
   reheating the substrate having the first layer and the second layer-forming material to provide a second layer, the substrate lying wholly or partly on the elevations of the first layer during the reheating.

2. The method as claimed in claim 1, wherein the particles have a softening temperature that is greater than a softening temperature of the glass powder.

3. The method as claimed in claim 2, wherein the step of heating comprises heating at a temperature that is at or above the softening temperature of the glass powder and below the softening temperature of the particles.

4. The method as claimed in claim 1, wherein the glass powder has a softening temperature that allows the glass powder to flow smoothly at a temperature below a deformation temperature of the substrate.

5. The method as claimed in claim 1, wherein the first layer-forming material comprises at least 5 to 99.7 vol % of glass powder.

6. The method as claimed in claim 1, wherein the first layer-forming material comprises particles having an average diameter in a range from 0.5 to 40 μm.

7. The method as claimed in claim 1, wherein the second layer-forming material comprises a glass powder.

8. The method as claimed in claim 1, wherein the substrate comprises one of a glass pane, a glass ceramic pane, and a ceramic pane.

9. The method as claimed in claim 1, wherein the first layer-forming material comprises a first inorganic, glass-based enamel component and structure-forming particles, the structure-forming particles having a softening temperature that is greater than a softening temperature of the first inorganic, glass-based enamel component.

10. The method as claimed in claim 9, wherein the second layer-forming material comprises a second inorganic, glass-based enamel component.

11. A method for producing a coated substrate, comprising the steps of:
    applying a first layer-forming material to a first side of a substrate, the first layer-forming material comprising a first glass powder and particles;

placing a second side of the substrate on a firing underlay, the second side being opposite to the first side;

heating the substrate having the first layer-forming material at a temperature that is at or above a softening temperature of the first glass powder and below a softening temperature of the particles to provide a first layer with elevations in a first glass component;

applying a second layer-forming material to the second side, the second layer-forming material comprising a second glass powder, placing the first side of the substrate having the first layer on the firing underlay so that the elevations act as spacers between the underlay and the first glass component;

reheating the substrate having the first layer and the second layer-forming material at a temperature that is at or above a softening temperature of the second glass powder to provide a second layer with a second glass component.

12. The method as claimed in claim 11, wherein the substrate comprises one of a glass pane, a glass ceramic pane, and a ceramic pane.

13. The method as claimed in claim 11, wherein the particles comprise an edgeless, circular outer contour.

14. The method as claimed in claim 11, wherein the softening temperatures of the first and second glass powders differ by less than 200° C.

15. The method as claimed in claim 11, wherein the softening temperatures of the first and second glass powders differ by less than 100° C.

16. The method as claimed in claim 11, wherein the softening temperatures of the second glass powder is not more than 50° C. above the softening temperature of the first glass powder.

17. The method as claimed in claim 11, wherein the first and second glass powders are the same.

* * * * *